US010515765B2

(12) United States Patent
Chong et al.

(10) Patent No.: US 10,515,765 B2
(45) Date of Patent: *Dec. 24, 2019

(54) MULTILAYER CERAMIC CAPACITOR

(71) Applicant: SAMSUNG ELECTRO-MECHANICS CO., LTD., Suwon-si, Gyeonggi-do (KR)

(72) Inventors: Won Sik Chong, Suwon-si (KR); Young Su Jang, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,861

(22) Filed: Apr. 23, 2019

(65) Prior Publication Data

US 2019/0252122 A1    Aug. 15, 2019

Related U.S. Application Data

(63) Continuation of application No. 15/647,975, filed on Jul. 12, 2017.

(30) Foreign Application Priority Data

Nov. 4, 2016 (KR) .................. 10-2016-0146626

(51) Int. Cl.
*H01G 4/30* (2006.01)
*H01G 4/232* (2006.01)
(Continued)

(52) U.S. Cl.
CPC ............ *H01G 4/30* (2013.01); *H01B 1/02* (2013.01); *H01B 3/12* (2013.01); *H01G 2/22* (2013.01);
(Continued)

(58) Field of Classification Search
CPC .......... H01G 4/30; H01G 4/228; H01G 4/232; H01G 4/236
See application file for complete search history.

(56) References Cited

U.S. PATENT DOCUMENTS

| 6,606,237 B1 | 8/2003 | Naito et al. |
| 2007/0025057 A1 | 2/2007 | Togashi et al. |
(Continued)

FOREIGN PATENT DOCUMENTS

| JP | 64-089508 A | 4/1989 |
| JP | H07-326536 A | 12/1995 |
(Continued)

OTHER PUBLICATIONS

U.S. Non-Final Office Action dated Feb. 25, 2019 issued in U.S. Appl. No. 15/647,975.
(Continued)

*Primary Examiner* — Eric W Thomas
(74) *Attorney, Agent, or Firm* — Morgan, Lewis & Bockius LLP

(57) ABSTRACT

A multilayer ceramic capacitor includes a body in which a plurality of dielectric layers are stacked, first and second external electrodes disposed on one surface of the body and spaced apart from each other, a plurality of first and second internal electrodes opposing each other, the dielectric layers being interposed therebetween, a first conductive via connecting the plurality of first internal electrodes to the first external electrode, a second conductive via connecting the plurality of second internal electrodes to the second external electrode, and a shielding layer covering at least a portion of an external surface of the body.

5 Claims, 6 Drawing Sheets

(51) Int. Cl.
  *H01G 2/22* (2006.01)
  *H01B 1/02* (2006.01)
  *H01B 3/12* (2006.01)
  *H01G 4/224* (2006.01)
  H01G 2/06 (2006.01)
  H01G 4/12 (2006.01)

(52) U.S. Cl.
  CPC ............ *H01G 4/224* (2013.01); *H01G 4/232* (2013.01); *H01G 2/06* (2013.01); *H01G 4/12* (2013.01)

(56) References Cited

U.S. PATENT DOCUMENTS

| | | | |
|---|---|---|---|
| 2007/0096254 | A1 | 5/2007 | Ritter et al. |
| 2008/0239622 | A1 | 10/2008 | Hsu et al. |
| 2015/0364255 | A1 | 12/2015 | Ning et al. |
| 2018/0130603 | A1* | 5/2018 | Chong .................... H01B 1/02 |

FOREIGN PATENT DOCUMENTS

| | | |
|---|---|---|
| JP | 2007-129224 | 5/2007 |
| JP | 2011-211210 | 10/2011 |
| JP | 2013-038298 A | 2/2013 |

OTHER PUBLICATIONS

U.S. Final Office Action dated Nov. 28, 2018 issued in U.S. Appl. No. 15/647,975.
U.S. Non-Final Office Action dated May 17, 2018 issued in U.S. Appl. No. 15/647,975.

* cited by examiner

MULTILAYER CERAMIC CAPACITOR

CROSS-REFERENCE TO RELATED APPLICATION(S)

This application is a continuation patent application of U.S. patent application Ser. No. 15/647,975, filed on Jul. 12, 2017, which claims the benefit of priority to Korean Patent Application No. 10-2016-0146626, filed on Nov. 4, 2016, the disclosures of which are incorporated herein by reference in their entireties.

TECHNICAL FIELD

The present disclosure relates to a multilayer ceramic capacitor.

BACKGROUND

There is an increasing need to prevent the phenomenon of voltage fluctuation in power source terminals due to the high frequencies, high current and low voltage in a central processing unit (CPU) portion of electronic products such as smartphones and personal computers.

In particular, low equivalence series inductance (ESL) is required in a capacitor of an output terminal of the power source.

In addition, since electromagnetic interference (EMI) shielding in terms of a set of electronic components is performed, while EMI shielding in terms of passive components is not performed, there is a need for EMI shielding in terms of passive components.

SUMMARY

An aspect of the present disclosure may provide a multilayer ceramic capacitor having low ESL and high EMI shielding performance at the same time.

According to an aspect of the present disclosure, a multilayer ceramic capacitor may include a body in which a plurality of dielectric layers are stacked; first and second external electrodes disposed on one surface of the body to be spaced apart from each other; a plurality of first and second internal electrodes opposing each other while having the dielectric layer interposed therebetween; a first conductive via connecting the plurality of first internal electrodes to the first external electrode; a second conductive via connecting the plurality of second internal electrodes to the second external electrode; and a shielding layer covering at least a portion of an external surface of the body.

According to another aspect of the present disclosure, a multilayer ceramic capacitor may include a body in which a plurality of dielectric layers are stacked; first to third external electrodes disposed on one surface of the body to be spaced apart from each other; a plurality of first and second internal electrodes opposing each other while having the dielectric layer interposed therebetween; a first conductive via connecting the plurality of first internal electrodes to the first external electrode; a second conductive via connecting the plurality of first internal electrodes to the second external electrode; a third conductive via connecting the plurality of second internal electrodes to the third external electrode; and a shielding layer covering at least a portion of an external surface of the body.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
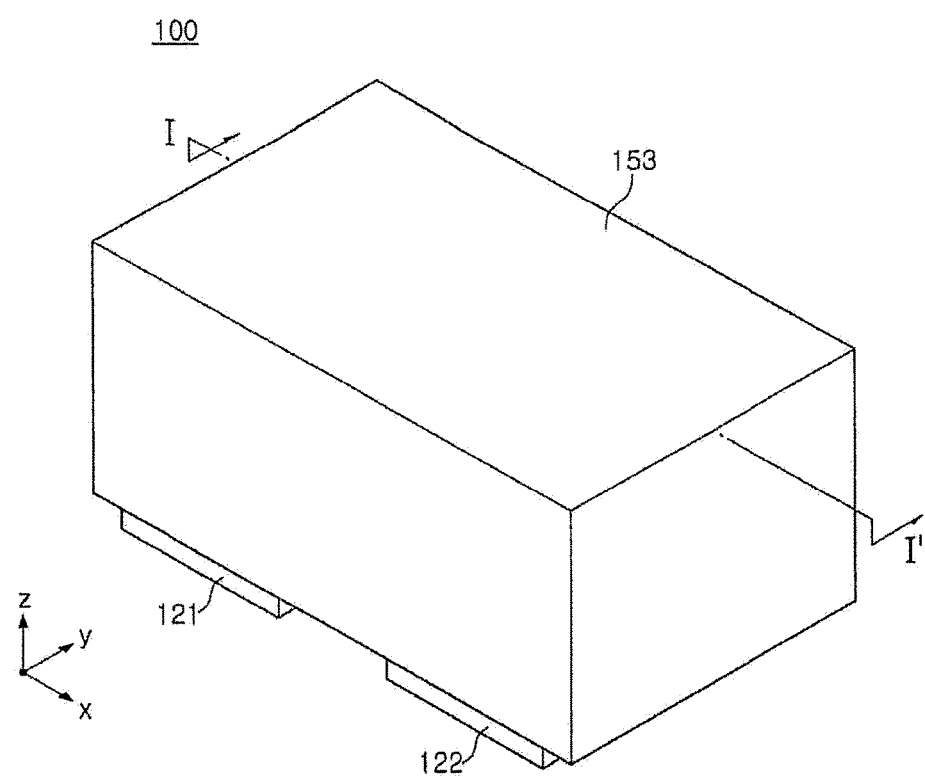
FIG. 1 illustrates a multilayer ceramic capacitor according to exemplary embodiments of the present disclosure.

Hereinafter, exemplary embodiments of the present disclosure will now be described in detail with reference to the accompanying drawings.

In the drawings, an X direction may be defined as a first direction or a length direction, a Y direction may be defined as a second direction or a width direction, and a Z direction may be defined as a third direction, a thickness direction, or a stacking direction.

Figure 2:
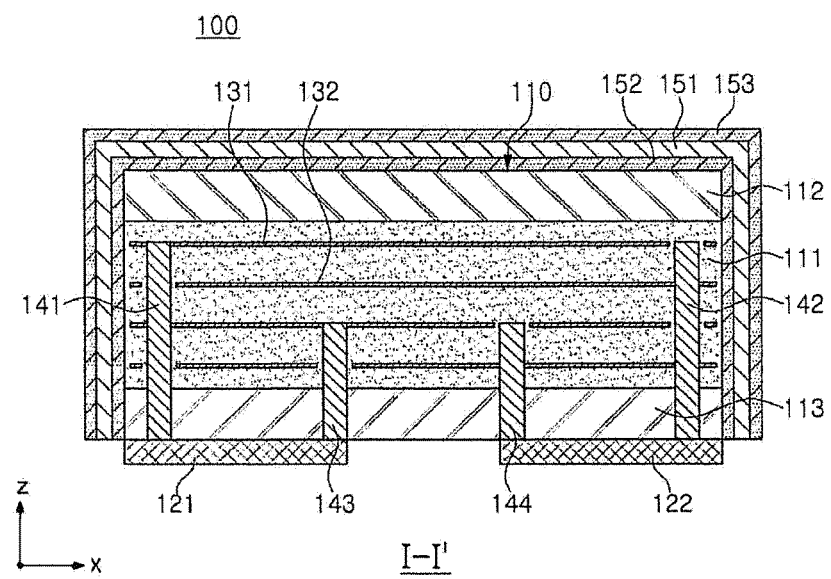
FIG. 2 is a cross-sectional view taken along line I-I' of FIG. 1.
Figure 3:
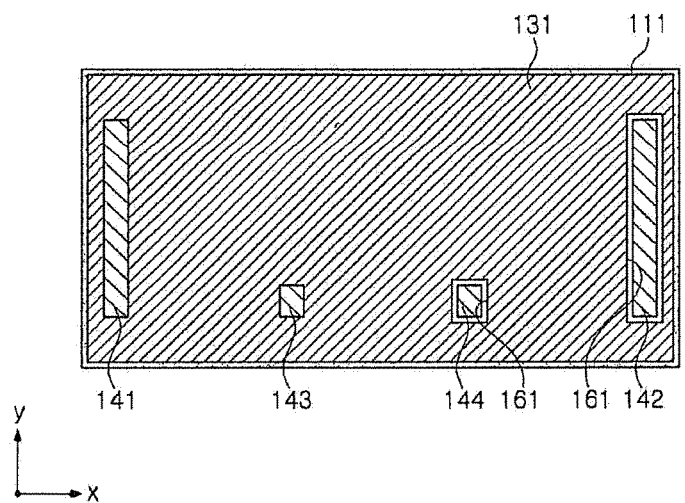
FIG. 3 is a plan view of a dielectric layer including a first internal electrode most adjacent a first external electrode, among a plurality of first internal electrodes of a multilayer ceramic capacitor, according to exemplary embodiments of the present disclosure.
Figure 4:
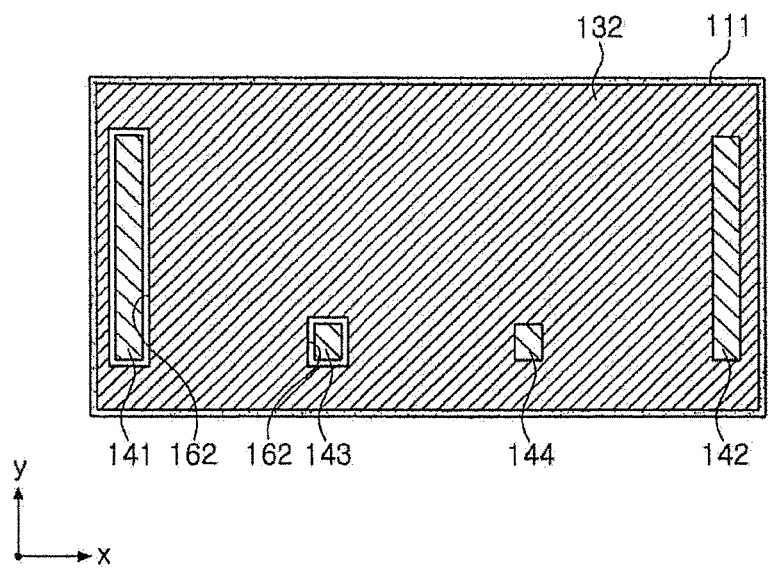
FIG. 4 is a plan view of a dielectric layer including a second internal electrode most adjacent a second external electrode, among a plurality of second internal electrodes of a multilayer ceramic capacitor, according to exemplary embodiments of the present disclosure.
Figure 5:
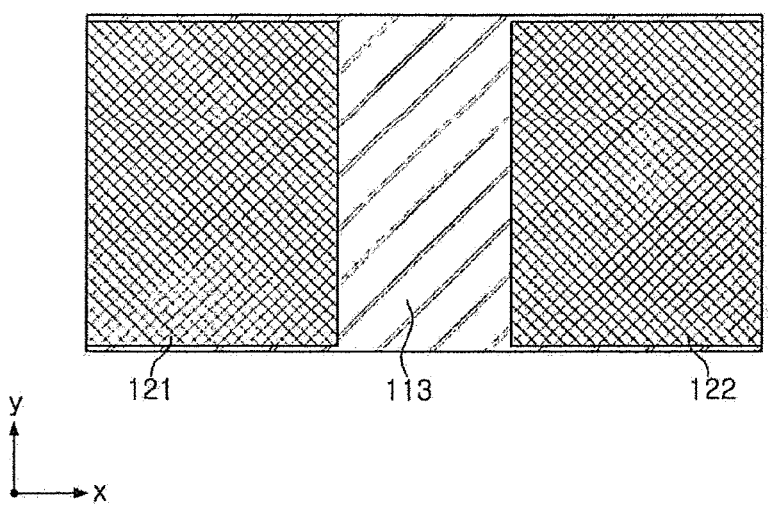
FIG. 5 is a bottom view of a multilayer ceramic capacitor according to exemplary embodiments of the present disclosure.

FIG. 1 illustrates a multilayer ceramic capacitor according to exemplary embodiments of the present disclosure and FIG. 2 is a cross-sectional view taken along line I-I' of FIG. 1. FIG. 3 is a plan view of a dielectric layer including a first internal electrode most adjacent a first external electrode, among a plurality of first internal electrodes of a multilayer ceramic capacitor, according to exemplary embodiments of the present disclosure. FIG. 4 is a plan view of a dielectric layer including a second internal electrode most adjacent a second external electrode, among a plurality of second internal electrodes of a multilayer ceramic capacitor, according to exemplary embodiments of the present disclosure. FIG. 5 is a bottom view of a multilayer ceramic capacitor according to exemplary embodiments of the present disclosure.

Referring to FIGS. 1 through 5, a structure of a multilayer ceramic capacitor 100 according to exemplary embodiments will be described.

The multilayer ceramic capacitor 100 according to exemplary embodiments may include a body 110 and first and second external electrodes 121 and 122 disposed on an external surface of the body 110.

The body 110 may be a form in which a plurality of dielectric layers 111 are stacked, and may be obtained by laminating and then sintering a plurality of green sheets. The plurality of dielectric layers 111 may be integrated with each other by the above-mentioned sintering operation. A shape and dimensions of the body 110 and the number of stacked dielectric layers 111 are not limited those illustrated in the present exemplary embodiments. For example, the body 110 may have a rectangular parallelepiped shape as illustrated in FIG. 1.

The dielectric layer 111 included in the body 110 may include a ceramic material having high permittivity, for example, barium titanate ($BaTiO_3$) based materials or strontium titanate ($SrTiO_3$) based materials, but other materials known in the art may also be used as long as they may obtain sufficient capacitance. The dielectric layer 111 may further include additives, organic solvents, plasticizers, binders, dispersing agents, and the like together with such a ceramic material, which is a main material, as needed. Among these, as the additive, the dielectric layer 111 may include the same material as that added to the internal electrodes 131 and 132, and concentration of the additive may be locally and appropriately adjusted to secure uniform sintering characteristics.

The body 110 may be formed by laminating four or more dielectric layers 111. For example, the body 110 may be formed by laminating 400 to 500 dielectric layers.

A top cover layer 112 and a bottom cover layer 113, formed by laminating the dielectric layers in which the internal electrodes are not included may be disposed in upper and lower portions of the body 110.

The body 110 may include first and second internal electrodes 131 and 132 disposed to oppose each other while having the dielectric layer 111 interposed therebetween.

The first and second internal electrodes 131 and 132 may be connected to different external electrodes 121 and 122 to have different polarities at the time of driving.

The first and second internal electrodes 131 and 132 may be obtained by printing and then sintering a paste including a conductive metal on one surface of the ceramic green sheet at a predetermined thickness.

The first and second internal electrodes 131 and 132 may be formed of nickel (Ni), copper (Cu), palladium (Pd), silver (Ag), or alloys thereof.

The first and second external electrodes 121 and 122 may be formed on the external surface of the body 110 to be electrically connected to the internal electrodes 131 and 132.

The first and second external electrodes 121 and 122 may be formed by a method of manufacturing a material including a conductive metal as a paste and then coating the paste onto the body 110. Examples of the conductive metal may include nickel (Ni), copper (Cu), palladium (Pd), gold (Au), or alloys thereof.

A plurality of first internal electrodes 131 may be electrically connected to the first external electrode 121 through a first conductive via 141, and a plurality of second internal electrodes 132 may be electrically connected to the second external electrode 122 through a second conductive via 142.

Conductive vias to be described below, including the first and second conductive vias 141 and 142, may be formed by forming a through-hole in the green sheet in advance and filling it with the conductive material, or may be formed by forming the through-hole in the body 110 using laser and filling it with the conductive material.

In the multilayer ceramic capacitor 100 according to exemplary embodiments, the first internal electrode 131 most adjacent the first external electrode 121 among the plurality of first internal electrodes 131 and the first external electrode 121 may be connected to each other by the third conductive via 143. In addition, the second internal electrode 132 most adjacent the second external electrode 122 among the plurality of second internal electrodes 132 and the second external electrode 122 may be connected to each other by the fourth conductive via 144.

Referring to FIG. 3, the first internal electrode 131 most adjacent the first external electrode 121 among the plurality of first internal electrodes 131 may be in contact with the first and third conductive vias 141 and 143, but may be disposed to be spaced apart from the second and fourth conductive vias 142 and 144 by a first insulating part 161.

Other first internal electrodes 131 other than the first internal electrode 131 most adjacent the first external electrode 121 among the plurality of first internal electrodes 131 may have the same shape as the first internal electrode 131 most adjacent the first external electrode 121 among the plurality of first internal electrodes 131.

However, in order to increase an area in which the first and second internal electrodes 131 and 132 overlap each other, other first internal electrodes 131 other than the first internal electrode 131 most adjacent the first external electrode 121 among the plurality of first internal electrodes 131 may have a shape in which the third conductive via 143 and the fourth conductive via 144 are not formed.

Referring to FIG. 4, the second internal electrode 132 most adjacent the second external electrode 122 among the plurality of second internal electrodes 132 may be in contact with the second and fourth conductive vias 142 and 144, but may be disposed to be spaced apart from the first and third conductive vias 141 and 143 by a second insulating part 162.

Other second internal electrodes 132 other than the second internal electrode 132 most adjacent the second external electrode 122 among the plurality of second internal electrodes 132 may have the same shape as the second internal electrode 132 most adjacent the second external electrode 122 among the plurality of second internal electrodes 132.

However, in order to increase an area in which the first and second internal electrodes 131 and 132 overlap each other, other second internal electrodes 132 other than the second internal electrode 132 most adjacent the second external electrode 122 among the plurality of second internal electrodes 132 may have a shape in which the third conductive via 143 and the fourth conductive via 144 are not formed.

In the multilayer ceramic capacitor according to exemplary embodiments, since the first and second internal electrodes 131 and 132 are electrically connected to the first and second external electrodes 121 and 122 by the first and second conductive vias 141 and 142, respectively, the area in which the first and second internal electrodes 131 and 132 overlap each other may be significantly increased. Since the area in which the first and second internal electrodes 131 and 132 overlap each other is significantly increased, capacitance of the multilayer ceramic capacitor 100 may be significantly increased.

In particular, in a case in which the area in which the first and second internal electrodes 131 and 132 overlap each other is increased by exposing the first and second internal electrodes 131 and 132 to the external surface of the body 110, the first insulating layer 152 may be disposed on the external surface of the body 110.

However, even in a case in which the first and second internal electrodes 131 and 132 are not exposed to the external surface of the body 110, the first insulating layer 152 may be disposed on the external surface of the body 110 to prevent conductive foreign materials from being introduced into the body 110.

In addition, referring to FIGS. 3 and 4, the first and second conductive vias 141 and 142 and third and fourth conductive vias 143 and 144 may have different lengths in a width direction y of the body.

For example, the lengths of the first and second conductive vias 141 and 142 in the width direction y of the body are set to be longer than the lengths of the third and fourth conductive vias 143 and 144 in the width direction y of the body, such that connectivity of the first and second conductive vias 141 and 142 to the plurality of first and second internal electrodes 131 and 132 may be improved.

Referring to FIG. 5, the first and second external electrodes 121 and 122 may be disposed on one surface of the body 110 to be spaced apart from each other.

The surface on which the first and second external electrodes 121 and 122 are disposed may be provided as amounting surface.

Since the first and second external electrodes 121 and 122 are disposed only on one surface of the body 110, an area required to mount the multilayer ceramic capacitor 100 may be reduced when the multilayer ceramic capacitor 100 is mounted on a board, and since a solder does not rise to the end surfaces of the body 110 of the multilayer ceramic capacitor 100, acoustic noise may be reduced.

In particular, in the multilayer ceramic capacitor 100 according to exemplary embodiments, the second insulating layer 153 to be described below may be disposed at the outermost portion of the body 110, and the second insulating layer 153 may serve to prevent the solder from rising to the end surfaces of the body 110 when the multilayer ceramic capacitor 100 is mounted on the board.

In the multilayer ceramic capacitor 100 according to exemplary embodiments, in addition to electrically connecting the plurality of first internal electrodes 131 to the first external electrode 121 by the first conductive via 141, the first internal electrode 132 which is adjacent the first external electrode 121 among the plurality of first internal electrodes 131 may be electrically connected to the first external electrode 121 by the third conductive via 143.

Further, in the multilayer ceramic capacitor 100 according to an exemplary embodiment, in addition to electrically connect the plurality of second internal electrodes 132 to the second external electrode 122 by the second conductive via 142, the second internal electrode 132 which is adjacent the second external electrode 122 among the plurality of second internal electrodes 132 may be electrically connected to the second external electrode 122 by the fourth conductive via 144.

The third and fourth conductive vias 143 and 144 may have lengths shorter than the first and second conductive vias 141 and 142.

Therefore, a path through which a current flows may be shortened in a case in which the third and fourth conductive vias 143 and 144 are present as compared to a case in which only the first and second conductive vias 141 are present.

Since the path through which the current flows may be shortened by the third and fourth conductive vias 143 and 144, ESL may be reduced.

Referring to FIG. 2, since the current flows in the order of the first external electrode 121, the third conductive via 143, the first internal electrode 131 which is adjacent the first external electrode 121 among the plurality of first internal electrodes 131, the second internal electrode 132 which is adjacent the second external electrode 122 among the plurality of second internal electrodes 132, the fourth conductive via 144, and the second external electrode 122, the path through which the current flows may be shortened as compared to the case in which the current flows through the first and second conductive vias 141 and 142 as in the related art, whereby the ESL may be reduced.

Since the multilayer ceramic capacitor according to the related art has the external electrodes disposed to be extended from both end surfaces of the body to both side surfaces and top and bottom surfaces of the body, the external electrodes may partially serve as an EMI shielding layer.

On the other hand, since the first and second external electrodes 121 and 122 are disposed only on one surface of the body 110, that is, the mounting surface as in the multilayer ceramic capacitor 100 according to exemplary embodiments, the multilayer ceramic capacitor may be vulnerable to external EMI.

However, the multilayer ceramic capacitor 100 according to exemplary embodiments may have a shielding layer 151 disposed to cover at least a portion of the external surface of the body 110.

The shielding layer 151 may be any one selected from the group consisting of a metal shielding layer formed of one metal selected from aluminum (Al), copper (Cu), nickel (Ni), and silver (Ag), a carbon-based shielding layer, a conductive polymer based shielding layer, a Ni—Cu—Ni plated conductive fabric and a Ni—Cu—Ni—Au plated conductive fabric, or a combination thereof.

Since the shielding layer 151 has metallic properties, the first insulating layer 152 may be disposed between the shielding layer 151 and the body 110, as illustrated in FIG. 2.

The first insulating layer 152 may be an epoxy resin, but is not limited thereto.

Further, when the multilayer ceramic capacitor 100 is mounted on the board, in order to prevent the shielding layer 151 from being electrically connected externally, the second insulating layer 153 may be disposed on the shielding layer 151.

The second insulating layer 153 may be formed of the same material as the first insulating layer 152, but is not limited thereto.

In a case in which the multilayer ceramic capacitor 100 includes both the first insulating layer 152 and the second insulating layer 153, the shielding layer 151 may be disposed between the first and second insulating layers 152 and 153.

When the first and second external electrodes 121 and 122 are disposed on the bottom surface of the body 110, that is, the mounting surface, the shielding layer 151 may be disposed on the side surfaces and the top surface of the body 110.

That is, since the shielding layer 151 covers the remaining surfaces other than the mounting surface of the body 110, the shielding layer 151 may prevent the multilayer ceramic capacitor 100 from being affected by external EMI.

Therefore, since the multilayer ceramic capacitor 100 according to exemplary embodiments includes the shielding layer 151 covering at least a portion of the external surface of the body 110, the multilayer ceramic capacitor 100 may have high EMI shielding performance.

At the same time, since the multilayer ceramic capacitor 100 according to exemplary embodiments includes the third and fourth conductive vias 143 and 144 connecting the first and second internal electrodes 131 and 132, most adjacent the first and second external electrodes 121 and 122 among the plurality of first and second internal electrodes 131 and 132 other than the first and second conductive vias 141 and 142 connecting the plurality of first and second internal electrodes 131 and 132 with the first and second external electrodes 121 and 122, the multilayer ceramic capacitor 100 may have low ESL.

Figure 6:
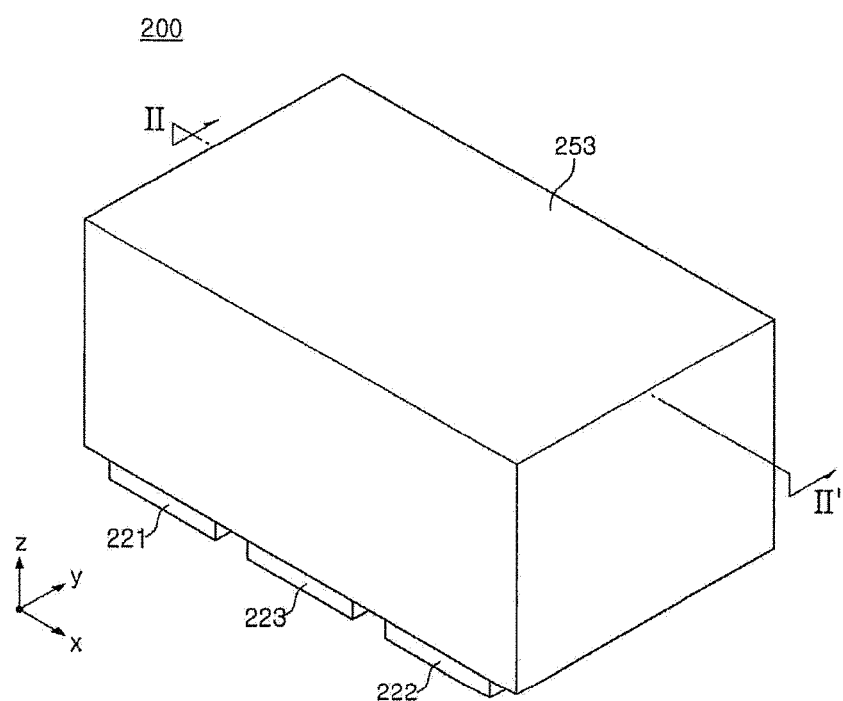
FIG. 6 illustrates a multilayer ceramic capacitor according to exemplary embodiments of the present disclosure.
Figure 7:
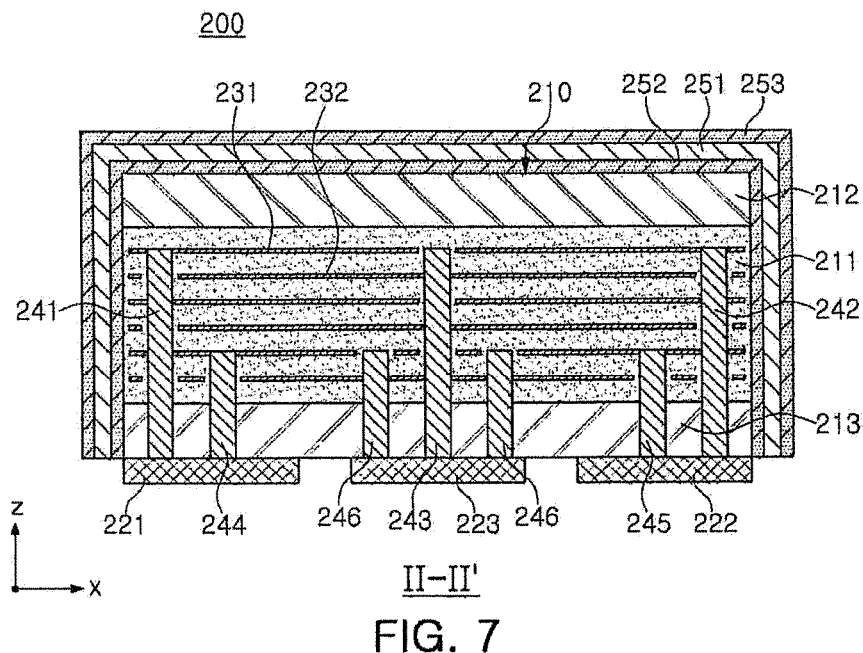
FIG. 7 is a cross-sectional view taken along the line II-II' of FIG. 6.
Figure 8:
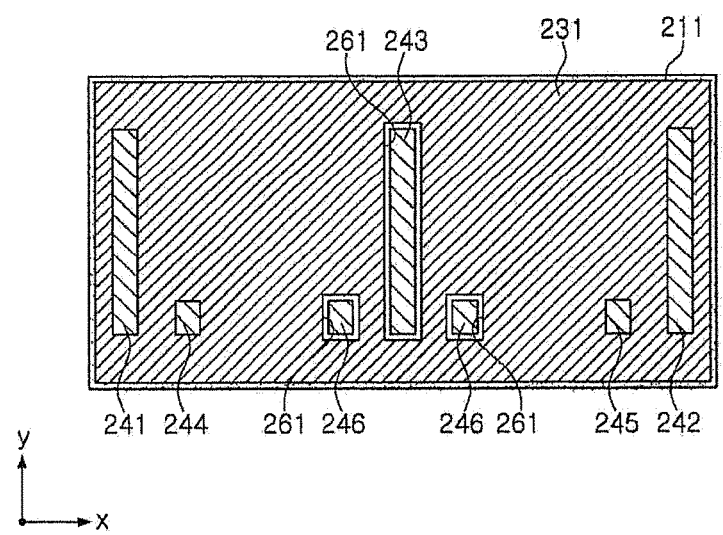
FIG. 8 is a plan view of a dielectric layer including a first internal electrode most adjacent first and second external electrodes among a plurality of first internal electrodes of a multilayer ceramic capacitor according to exemplary embodiments of the present disclosure.
Figure 9:
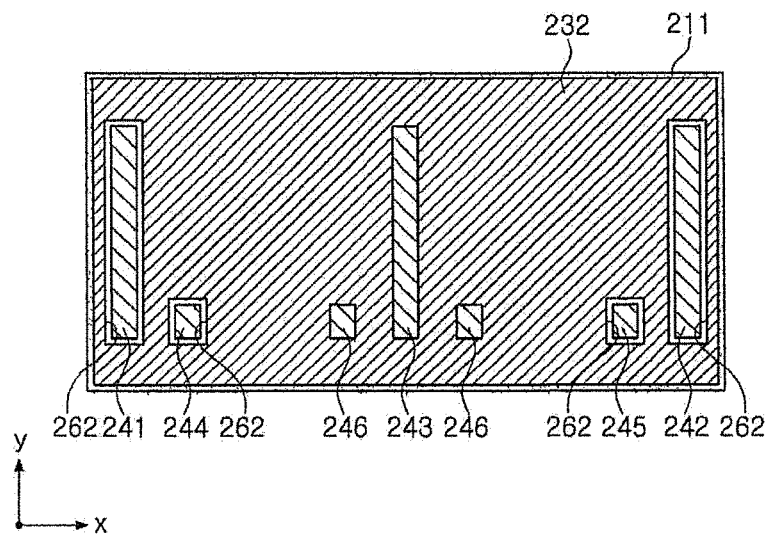
FIG. 9 is a plan view of a dielectric layer including a second internal electrode most adjacent a third external electrode, among a plurality of second internal electrodes of a multilayer ceramic capacitor, according to exemplary embodiments of the present disclosure.
Figure 10:
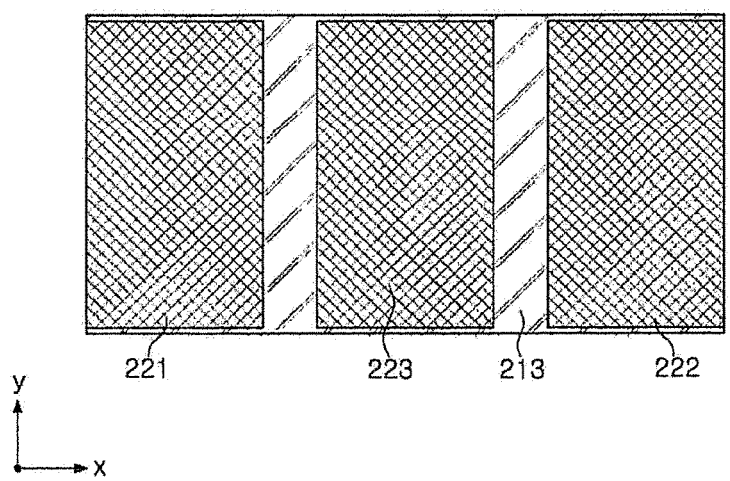
FIG. 10 is a bottom view of a multilayer ceramic capacitor according to exemplary embodiments of the present disclosure.

FIG. 6 illustrates a multilayer ceramic capacitor according to exemplary embodiments of the present disclosure and FIG. 7 is a cross-sectional view taken along the line II-II' of FIG. 6. FIG. 8 is a plan view of a dielectric layer including a first internal electrode most adjacent first and second external electrodes among a plurality of first internal electrodes of a multilayer ceramic capacitor according to exemplary embodiments of the present disclosure. FIG. 9 is a plan view of a dielectric layer including a second internal electrode most adjacent a third external electrode, among a plurality of second internal electrodes of a multilayer ceramic capacitor, according to exemplary embodiments of the present disclosure. FIG. 10 is a bottom view of a multilayer ceramic capacitor according to exemplary embodiments of the present disclosure.

A structure of a multilayer ceramic capacitor 200 according to exemplary embodiments will be described with reference to FIGS. 6 through 10.

The multilayer ceramic capacitor 200 according to exemplary embodiments may include a body 210 and first to third external electrodes 221, 222 and 223 disposed on an external surface of the body 210.

The body 210 may be a form in which a plurality of dielectric layers 211 are stacked, and may be obtained by laminating and then sintering a plurality of green sheets. The plurality of dielectric layers 211 may be integrated with each other in the above-mentioned sintering operation. A shape and dimensions of the body 210 and the number of stacked dielectric layers 211 are not limited to those illustrated in the present exemplary embodiments. For example, the body 210 may have a hexahedral shape as illustrated in FIG. 6.

The dielectric layer 211 included in the body 210 may include a ceramic material having high permittivity, for example, barium titanate ($BaTiO_3$) based materials or strontium titanate ($SrTiO_3$) based materials, but other materials known in the art may also be used as long as sufficient capacitance may be obtained therewith. The dielectric layer 211 may further include additives, organic solvents, plasticizers, binders, dispersing agents, and the like, together with such a ceramic material, which is a main material, as needed. Among these, as the additive, the dielectric layer 211 may include the same material as that added to the internal electrodes 231 and 232, and a concentration of the additive may be locally and appropriately adjusted to secure uniform sintering characteristics.

The body 210 may be formed by laminating four or more dielectric layers 211. For example, the body 210 may be formed by laminating 400 to 500 dielectric layers 211.

A top cover layer 212 and a bottom cover layer 213, formed by laminating the dielectric layers in which the internal electrodes are not included may be disposed in upper and lower portions of the body 210.

The body 210 may include first and second internal electrodes 231 and 232 disposed to oppose each other while having the dielectric layer 211 interposed therebetween.

The first internal electrode 231 may be connected to the first and second external electrodes 221 and 222 and the second internal electrode 232 may be connected to the third external electrode 223, such that the first and second internal electrodes 231 and 232 may have different polarities at the time of driving.

The first and second internal electrodes 231 and 232 may be obtained by printing and then sintering a paste including a conductive metal on one surface of the ceramic green sheet to a predetermined thickness.

The first and second internal electrodes 231 and 232 may be formed of nickel (Ni), copper (Cu), palladium (Pd), silver (Ag) or alloys thereof.

The first to third external electrodes 221, 222 and 223 may be formed on the external surface of the body 210 to be electrically connected to the internal electrodes 231 and 232.

The first to third external electrodes 221, 222 and 223 may be formed by a method of manufacturing a material including a conductive metal as a paste and then coating the paste onto the body 210. Examples of the conductive metal may include nickel (Ni), copper (Cu), palladium (Pd), gold (Au) or alloys thereof.

A plurality of first internal electrodes 231 may be electrically connected to the first external electrode 221 through a first conductive via 241.

In addition, the first internal electrodes 231 may be electrically connected to the second external electrode 222 through a second conductive via 242.

On the other hand, a plurality of second internal electrodes 232 may be electrically connected to the third external electrode 223 through a third conductive via 243.

Conductive vias to be described below, including the first to third conductive vias 241, 242 and 243, may be formed by forming a through-hole in the green sheet in advance and filling it with the conductive material, or may be formed by forming the through-hole in the body 210 using laser and filling it with the conductive material.

In the multilayer ceramic capacitor 200 according to exemplary embodiments, the first internal electrode 231 most adjacent the first external electrode 221 among the plurality of first internal electrodes 231 and the first external electrode 221 may be connected to each other by a fourth conductive via 244. The first internal electrode 231 most adjacent the second external electrode 222 among the plurality of first internal electrodes 231 and the second external electrode 222 may be connected to each other by a fifth conductive via 245. In addition, the second internal electrode 232 most adjacent the third external electrode 223 among the plurality of second internal electrodes 232 and the third external electrode 223 may be connected to each other by a sixth conductive via 246.

Referring to FIG. 8, the first internal electrode 231 most adjacent the first and second external electrodes 221 and 222 among the plurality of first internal electrodes 231 may be in contact with the first, second, fourth and fifth conductive vias 241, 242, 244 and 245, but may be disposed to be spaced apart from the third and sixth conductive vias 243 and 246 by a first insulating part 261.

Other first internal electrodes 231 other than the first internal electrode 231 most adjacent the first and second external electrodes 221 and 222 among the plurality of first internal electrodes 231 may have the same shape as the first internal electrode 231 most adjacent the first and second external electrodes 221 and 222 among the plurality of first internal electrodes 231.

However, in order to increase an area in which the first and second internal electrodes 231 and 232 overlap each other, other first internal electrodes 231 other than the first internal electrode 231 most adjacent the first and second external electrodes 221 and 222 among the plurality of first internal electrodes 231 may have a shape in which the fourth to sixth conductive vias 244, 245 and 246 are not formed.

Referring to FIG. 9, the second internal electrodes 232, most adjacent the third external electrode 223 among the plurality of second internal electrodes 232 may be in contact with the third and sixth conductive vias 243 and 246, but may be disposed to be spaced apart from the first, second, fourth, and fifth conductive vias 241, 242, 244 and 245 by a second insulating part 262.

Other second internal electrodes 232 other than the second internal electrode 232 most adjacent the third external electrode 223 among the plurality of second internal electrodes 232 may have the same shape as the second internal electrode 232 most adjacent the third external electrode 223 among the plurality of second internal electrodes 232.

However, in order to increase an area in which the first and second internal electrodes 231 and 232 overlap each other, other second internal electrodes 232 other than the second internal electrode 232 most adjacent the third external electrode 223 among the plurality of second internal electrodes 232 may have a shape in which the fourth to sixth conductive vias 244, 245 and 246 are not formed.

Referring to FIG. 9, a plurality of sixth conductive vias 246 may be formed.

For example, the sixth conductive vias 246 may be disposed symmetrically about the third conductive via 243. In a case in which the sixth conductive vias 246 are disposed symmetrically about the third conductive via 243, each of the sixth conductive vias 246 may be disposed to be adjacent the fourth conductive via 244 or the fifth conductive via 245, whereby a path through which the current flows may be significantly reduced.

In the multilayer ceramic capacitor 200 according to exemplary embodiments, since the first and second internal electrodes 231 and 232 are electrically connected to the first to third external electrodes 221, 222 and 223 by the first to third conductive vias 241, 242 and 243, the area in which the first and second internal electrodes 231 and 232 overlap each other may be significantly increased. Since the area in which the first and second internal electrodes 231 and 232 overlap each other is significantly increased, capacitance of the multilayer ceramic capacitor 200 may be significantly increased.

In particular, in a case in which the area in which the first and second internal electrodes 231 and 232 overlap each other is increased by exposing the first and second internal electrodes 231 and 232 to the external surface of the body 210, the first insulating layer 252 may be disposed on the external surface of the body 210.

However, even in a case in which the first and second internal electrodes 231 and 232 are not exposed to the external surface of the body 110, the first insulating layer 252 may be disposed on the external surface of the body 210 to prevent conductive foreign materials from being introduced into the body 210.

Referring to FIG. 10, the first to third external electrodes 221, 222 and 223 may be disposed on one surface of the body 210 to be spaced apart from each other.

The surface on which the first to third external electrodes 221, 222 and 223 are disposed may be provided as a mounting surface.

The third external electrode 223 may be disposed between the first and second external electrodes 221 and 222, that is, in the central portion on one surface of the body 210.

Since the first to third external electrodes 221, 222 and 223 are only disposed on one surface of the body 210, an area required to mount the multilayer ceramic capacitor 200 may be reduced when the multilayer ceramic capacitor 200 is mounted on a board, and since a solder does not rise to the end surfaces of the body 210 of the multilayer ceramic capacitor 200, acoustic noise may be reduced.

In particular, in the multilayer ceramic capacitor 200 according to exemplary embodiments, the second insulating layer 253 to be described below may be disposed at the outermost portion of the body 210, and the second insulating layer 253 may serve to prevent the solder from rising to the end surfaces of the body 210 when the multilayer ceramic capacitor 200 is mounted on the board.

In the multilayer ceramic capacitor 200 according to exemplary embodiments, in addition to electrically connect the plurality of first internal electrodes 231 to the first and second external electrodes 221 and 222 by the first and second conductive vias 241 and 242, the first internal electrode 221 which is adjacent the first and second external electrodes 221 and 222 among the plurality of first internal electrodes 231 may be electrically connected to the first and second external electrodes 221 and 222 by the fourth and fifth conductive vias 244 and 245.

Further, in the multilayer ceramic capacitor 200 according to exemplary embodiments, in addition to electrically connecting the plurality of second internal electrodes 232 to the third external electrode 223 by the third conductive via 243, the second internal electrode 232 which is adjacent the third external electrode 223 among the plurality of second internal electrodes 232 may be electrically connected to the third external electrode 233 by the sixth conductive via 246.

The fourth to sixth conductive vias 244, 245 and 246 may have lengths shorter than the first to third conductive vias 241, 242 and 243.

Therefore, a path through which a current flows may be shortened in a case in which the fourth to sixth conductive vias 244, 245 and 246 are present as compared to a case in which only the first to third conductive vias 241, 242, and 243 are present.

Since the path through which the current flows may be shortened by the fourth to sixth conductive vias 244, 245 and 246, ESL may be reduced.

Since the multilayer ceramic capacitor according to the related art has the external electrodes disposed to be extended from both end surfaces of the body to both side surfaces and top and bottom surfaces of the body, the external electrodes may partially serve as an EMI shielding layer.

On the other hand, since the first to third external electrodes 221, 222 and 223 are disposed only on one surface of the body 210, that is, the mounting surface as in a multilayer ceramic capacitor 200 according to another exemplary embodiment, the multilayer ceramic capacitor may be vulnerable to external EMI.

However, the multilayer ceramic capacitor 200 according to exemplary embodiments may have a shielding layer 251 disposed to cover at least a portion of the external surface of the body 210.

The shielding layer 251 may be any one selected from the group consisting of a metal shielding layer formed of one metal selected from aluminum (Al), copper (Cu), nickel (Ni) and silver (Ag), a carbon-based shielding layer, a conductive polymer based shielding layer, a Ni—Cu—Ni plated conductive fabric, and a Ni—Cu—Ni—Au plated conductive fabric or a combination thereof.

Since the shielding layer 251 has metallic properties, the first insulating layer 251 may be disposed between the shielding layer 251 and the body 210, as illustrated in FIG. 7.

The first insulating layer 252 may be an epoxy resin, but is not limited thereto.

Further, when the multilayer ceramic capacitor 200 is mounted on the board, in order to prevent the shielding layer 251 from being electrically connected externally, the second insulating layer 253 may be disposed on the shielding layer 251.

The second insulating layer 253 may be formed of the same material as the first insulating layer 252, but is not limited thereto.

In a case in which the multilayer ceramic capacitor 200 includes both the first insulating layer 252 and the second insulating layer 253, the shielding layer 251 may be disposed between the first and second insulating layers 252 and 253.

When the first to third external electrodes 221, 222 and 223 are disposed on the bottom surface of the body 210, that is, the mounting surface, the shielding layer 251 may be disposed on the side surfaces and the top surface of the body 210.

That is, since the shielding layer 251 covers the remaining surfaces other than the mounting surface of the body 210, the shielding layer 151 may prevent the multilayer ceramic capacitor 200 from being affected by external EMI.

Therefore, since the multilayer ceramic capacitor 200 according to exemplary embodiments includes the shielding layer 251 covering at least a portion of the external surface of the body 210, the multilayer ceramic capacitor 200 may have high EMI shielding performance.

At the same time, since the multilayer ceramic capacitor 200 according to another exemplary embodiment includes the fourth to sixth conductive vias 244, 245 and 246 having lengths shorter than the first to third conductive vias 241, 242 and 243, in addition to the first to third conductive vias 241, 242 and 243 connecting the plurality of first and second internal electrodes 231 and 232 to the first to third external electrodes 221, 222 and 223, the multilayer ceramic capacitor 200 may have low ESL.

In general, in the case in which the external electrodes having metallic properties are not disposed on both end surfaces or both side surfaces of the body, the multilayer ceramic capacitor is vulnerable to EMI, as set forth above, according to the exemplary embodiments of the present disclosure, since the multilayer ceramic capacitor includes the shielding layer including at least a portion of the external surface of the body, the multilayer ceramic capacitor may have high EMI shielding performance.

At the same time, since the multilayer ceramic capacitor according to exemplary embodiments includes the conductive via connecting internal electrodes, most adjacent the external electrodes among the plurality of internal electrodes in addition to the conductive vias connecting a plurality of internal electrodes and external electrodes, the multilayer ceramic capacitor may have low ESL.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor, comprising:
a body in which a plurality of dielectric layers are stacked;
first and second external electrodes disposed on one surface of the body and spaced apart from each other;
a plurality of first and second internal electrodes opposing each other, the dielectric layers being interposed therebetween;
a first conductive via directly connecting the plurality of first internal electrodes to the first external electrode;
a second conductive via directly connecting the plurality of second internal electrodes to the second external electrode;
a third conductive via directly connected to one of the plurality of first internal electrodes which are connected to the first conductive via;
a fourth conductive via directly connected to one of the plurality of second internal electrodes which are connected to the second conductive via; and
a shielding layer covering at least a portion of an external surface of the body,
wherein the third conductive via is shorter than the first conductive via, and the fourth conductive via is shorter than the second conducive via.

2. The multilayer ceramic capacitor of claim 1, wherein the first and second external electrodes are disposed on a bottom surface of the body, and
the shielding layer is disposed on end surfaces and a top surface of the body.

3. The multilayer ceramic capacitor of claim 1, further comprising a first insulating layer disposed between the shielding layer and the body.

4. The multilayer ceramic capacitor of claim 1, further comprising a second insulating layer disposed on the shielding layer.

5. The multilayer ceramic capacitor of claim 1, wherein the shielding layer is any one selected from the group consisting of a metal shielding layer formed of one metal selected from aluminum (Al), copper (Cu), nickel (Ni) and silver (Ag), a carbon-based shielding layer, a conductive polymer based shielding layer, a Ni—Cu—Ni plated conductive fabric, and a Ni—Cu—Ni—Au plated conductive fabric, or a combination thereof.

* * * * *